UNITED STATES PATENT OFFICE.

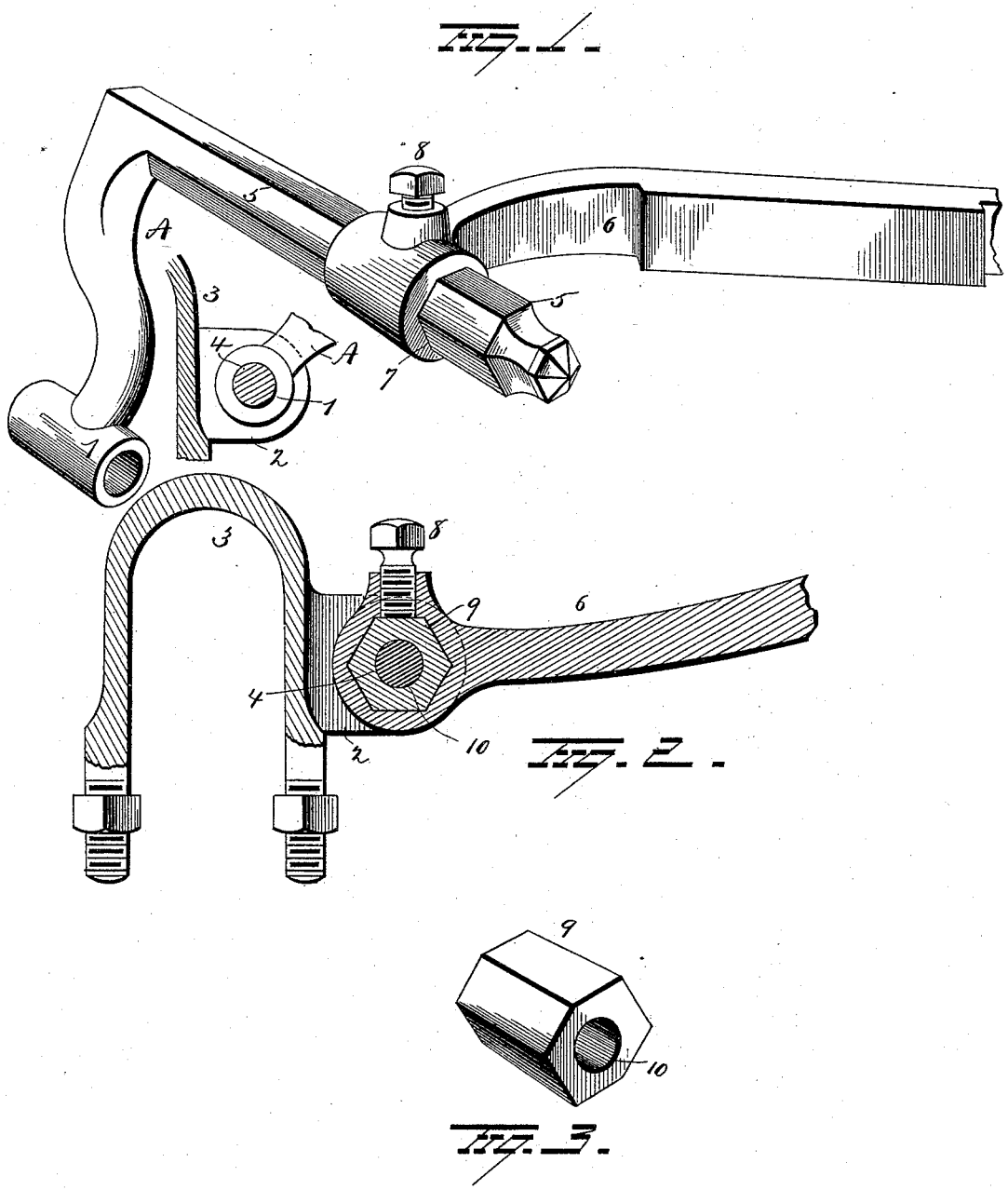

THOMAS R. TROMBLEY, OF GLENS FALLS, NEW YORK.

THILL-COUPLING.

SPECIFICATION forming part of Letters Patent No. 416,196, dated December 3, 1889.

Application filed May 29, 1889. Serial No. 312,496. (No model.)

*To all whom it may concern:*

Be it known that I, THOMAS R. TROMBLEY, of Glens Falls, in the county of Warren and State of New York, have invented certain new and useful Improvements in Thill-Couplings; and I do hereby declare the following to be a full, clear, and exact description of the invention, such as will enable others skilled in the art to which it appertains to make and use the same.

My invention relates to an improvement in thill-couplings; and the object is to furnish means for raising or lowering thills or poles relative to the fore axle, to be more readily accommodated to different-sized horses, and also to provide for the coupling of thills or poles of different widths.

A still further object is to provide removable bushings, to render these same pole or thill irons attachable to vehicles employing the ordinary coupling.

With these ends in view my invention consists in certain novel features of construction and combinations of parts, as will be hereinafter described, and pointed out in the claims.

In the accompanying drawings, Figure 1 is a view in perspective of a supporting-iron with a pole-iron attached. Fig. 2 is a view of a thill-iron, and Fig. 3 is a view of the removable bushing.

A represents a supporting-iron, upon which the pole or thills are held. This iron is provided with the socket 1 at one end, which is adapted to be inserted between the lugs 2 2 of the axle-clips 3 on the front axle, where it is held by a bolt or similar device 4, passing through it in the usual manner for coupling thills or poles to vehicles. From this socket a portion of the iron extends forward for some distance, and is bent laterally and provided with the oppositely-extending arm 5, which preferably extends parallel with the socket 1. This arm 5 is made angular in cross-section, and usually with about six sides, though not necessarily. Its length is sufficient, together with its mate on the other side, to allow for the different widths of poles and thills, so that, instead of their always having to be an exact width for insertion between the lugs 2 2, by the use of these supporting-irons thills or poles varying from six to eight inches in width may be readily placed on the same vehicle without material change. The thill or pole irons 6 6 are furnished with correspondingly-shaped openings or sockets 7, through which the angular arms 5 extend, and set-screws 8 in the irons 6 6 are tightened to hold the shafts or thills in place. By this construction it is seen that not only shafts or poles of different widths may be employed, but that they may be shifted laterally for a greater or less distance; also, one of the salient features of the invention consists in the ability to raise or lower or extend the point of support of the thills or poles, and this is done simply by turning the supporting-arms after the thills or pole have been removed to the desired angle or elevation, and then placing the shafts or pole on as before; or, in other words, by merely changing the angle between the supporting-irons and the thill or pole irons, as occasion may require, to elevate or lower the support of the thills or pole for the accommodation of horses of different heights, or for extending or lengthening the thills or pole or for shortening the same.

It frequently happens to be desirable to attach these thills or poles having angular sockets 7, such as described, in the ordinary manner—that is, by the usual bolt-coupling. To do this, it is important that the socket should be round, so as to fit the bolt; hence I use a removable angular bushing 9 to fill the socket, and this bushing is provided with an opening 10 to receive the bolt. The bushing of course is not often required; but when it is used it is held by the set-screw 8.

It is evident that slight changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. In a thill-coupling, the combination, with pole or thills having sockets in their ends, of supporting-irons having extended arms adapted to enter the sockets, and means for securing the pole or thills to the supporting-irons at different elevations relative to the point of support, substantially as set forth.

2. In a thill-coupling, the combination, with pole or thills having angular sockets in their ends, of supporting-irons, each having an angular arm adapted to enter the sockets in the pole or shafts, and set-screws for holding the pole or shafts on the arms, substantially as set forth.

3. In a thill-coupling, the combination, with pole or shafts having irons thereon with angular sockets therein, of supporting-irons having a socket in one end and an extended angular arm adapted to enter the sockets in the irons, and set-screws for securing the pole or shafts in place, substantially as set forth.

4. In a thill-coupling, the combination, with an axle-clip having lugs thereon, of pole or shafts having irons thereon with angular sockets therein, and a hollow angular bushing to be removably held in the sockets, substantially as set forth.

In testimony whereof I have signed this specification in the presence of two subscribing witnesses.

THOMAS R. TROMBLEY.

Witnesses:
CHARLES W. HURD,
NELSON LA SALLE.